Jan. 17, 1928.
J. P. HANSON
1,656,821
SIGNAL FOR AUTOMOBILES
Original Filed June 17, 1924   3 Sheets-Sheet 1
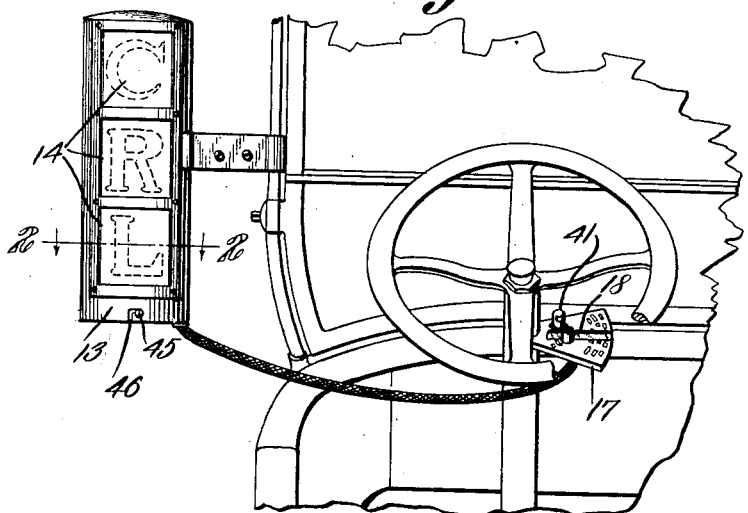
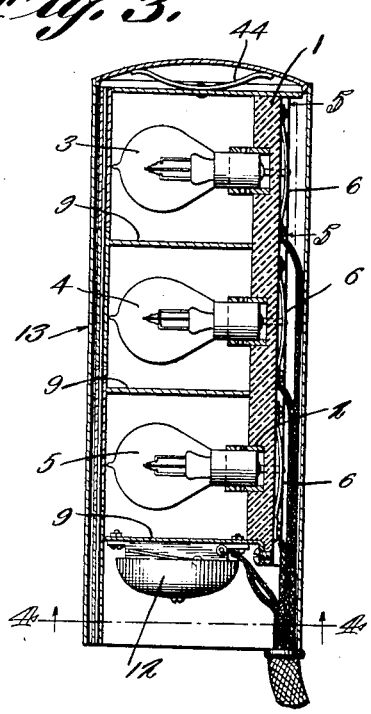
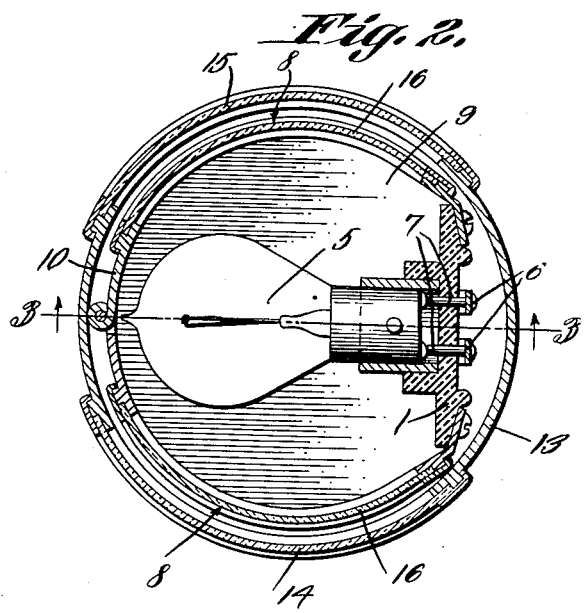
J. P. Hanson,
Inventor Jan. 17, 1928.　　　　　　　　　　　　　　　　1,656,821
J. P. HANSON
SIGNAL FOR AUTOMOBILES
Original Filed June 17, 1924　　3 Sheets-Sheet 2
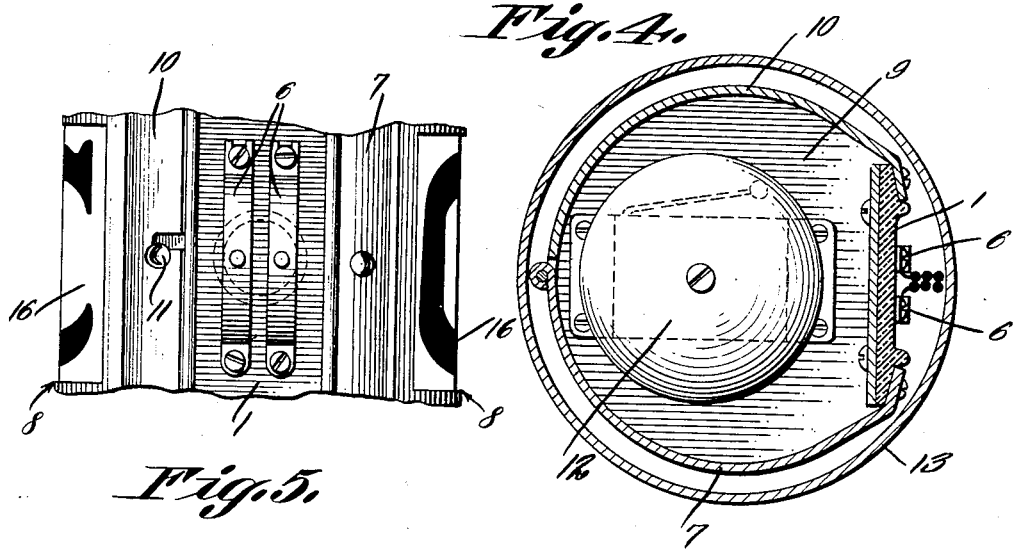
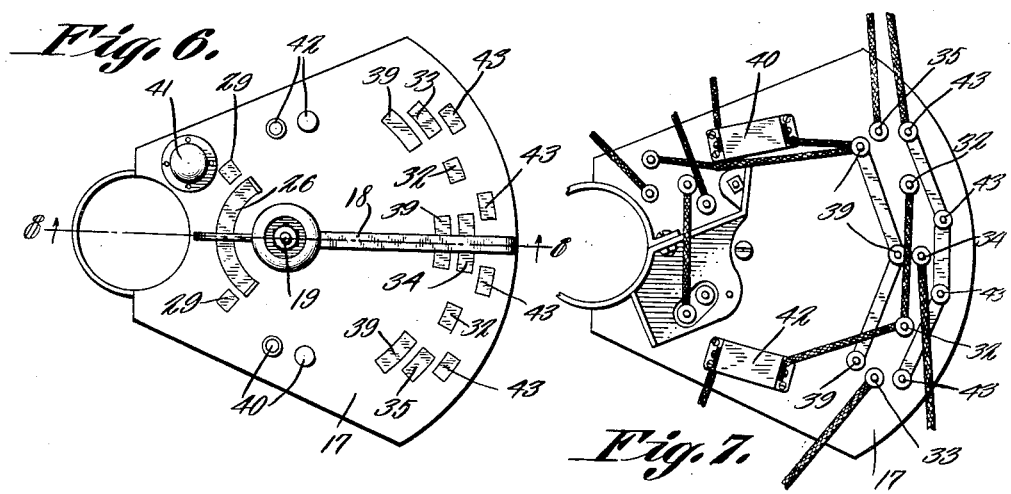
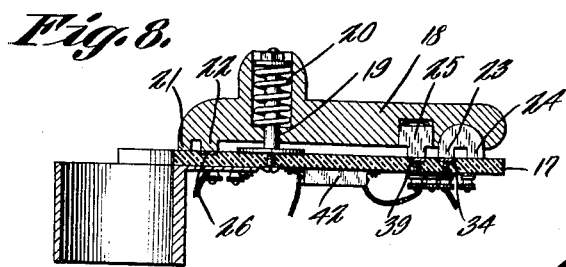
J. P. Hanson,
Inventor.

Jan. 17, 1928.
J. P. HANSON
1,656,821
SIGNAL FOR AUTOMOBILES
Original Filed June 17, 1924    3 Sheets-Sheet 3
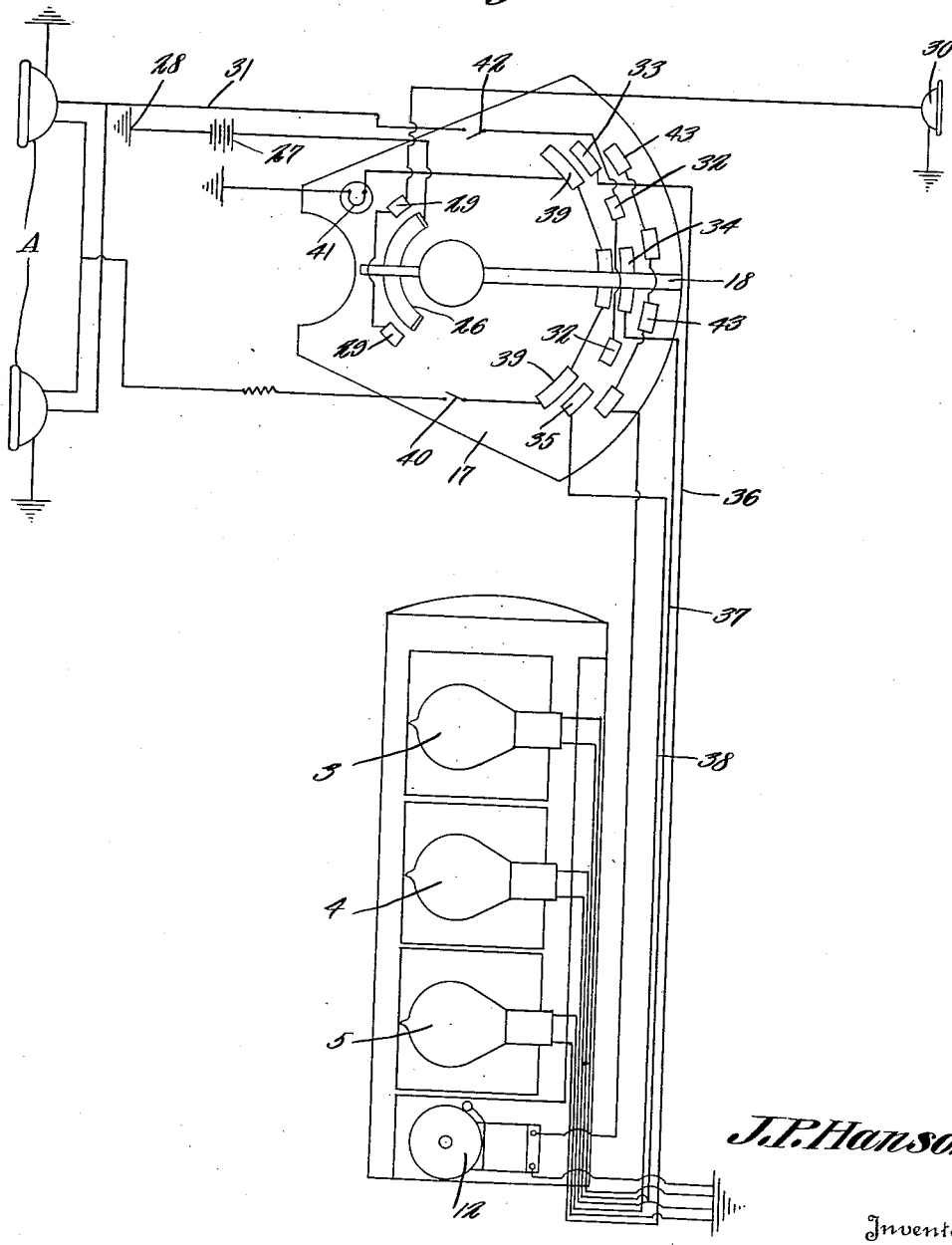

Patented Jan. 17, 1928.

1,656,821

UNITED STATES PATENT OFFICE.

JOHN P. HANSON, OF BUTTE, MONTANA.

SIGNAL FOR AUTOMOBILES.

Application filed June 17, 1924, Serial No. 720,649. Renewed October 7, 1927.

This invention relates to a signal or semaphore for use on motor vehicles and is designed primarily to provide a simplified embodiment of the structure shown, for example, in my copending application of even date herewith.

One of the objects of the invention is to dispense with a rotatable signal device and to provide, in lieu thereof, superposed compartments adapted to be separately illuminated for the purpose of displaying selected signals.

Another object is to provide a simple, durable and compact structure that can be applied readily to a motor vehicle and the selected signals of which will be displayed both in front and at the rear of the vehicle.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings

Figure 1 is an elevation of a portion of a vehicle having the present improvements applied thereto.

Fig. 2 is an enlarged section on line 2—2 Fig. 1.

Fig. 3 is a section on a reduced scale taken on line 3—3 Fig. 2.

Fig. 4 is a section on line 4—4 Fig. 3, said section being on an enlarged scale.

Fig. 5 is an enlarged section on line 5—5 Fig. 3.

Fig. 6 is a face view of the switch board.

Fig. 7 is a back view thereof.

Fig. 8 is a section on line 8—8 Fig. 6.

Fig. 9 is a view showing in diagram the complete apparatus constituting this invention.

Referring to the figures by characters of reference 1 designates a base strip formed of suitable insulating material and carrying spaced lamp sockets 2 in which are detachably secured superposed lamps 3, 4 and 5. A pair of spring contact strips 6 is provided for each lamp, these strips being mounted on the outer face of the strip 1 and constituting springs which serve to thrust the contact pins 7 firmly against the inserted lamps. Secured to one side edge portion of the strip 1 is an arcuate plate 7 having superposed arcuate windows 8. Extending from this plate between the windows and adjacent the top and bottom of the plate are partitions 9 and hingedly connected to one edge of the plate 7 is another arcuate plate 10 adapted to be secured detachably to the base strip 1 as shown at 11 in Fig. 5. This hinged plate is also provided with windows 8 corresponding with the windows in the plate 7 and the partitions 9 are adapted to fit up against plate 10 when said plate is secured in normal position. The partitions also fit snugly against strip 1 and thus serve to divide into separate non-communicating compartments the interior of the cage formed by the strip 1 and plates 7 and 10. An audible alarm that can be in the form of an electric bell 12 is secured to the bottom face of the lower partition 9.

The cage is adapted to be inserted into a cylindrical housing 13 provided with superposed windows 14 in the front and back portions thereof and corresponding with the windows 8. These windows 14 can be closed with translucent glass. The windows 8 are adapted to be closed with colored glass. The glass in the windows 14 has been indicated at 15 while the glass used in the windows 8 has been indicated at 16. One color of glass in the upper windows 8, another colored glass is used in the intermediate windows 8 and glass of a third color is used in the lower windows 8. On the glass of the upper windows is painted or otherwise displayed a direction symbol or letter, such as "C", indicating "caution". The glass of the middle windows can be provided with a suitable symbol or letter such as "R" for indicating a right hand turn, and the glass of the lower windows can be provided with a suitable symbol or letter such as "L" for indicating a left hand turn. It will be obvious that when lamp 3 is lighted the upper glasses 8 will be illuminated; that when the middle lamp 4 is lighted the middle glasses 8 will be illuminated; and when the lower lamp 5 is lighted the lower glasses 8 will be illuminated.

For the purpose of controlling the circuits to the lamps a controlling mechanism such as disclosed in my copending application is provided, this having been illustrated in Figs. 6 to 9 inclusive of the accompanying drawings. This mechanism includes a switch board 17 on which a switch lever 18 is mounted to swing about a pivot stud 19, there being a spring 20 for pressing the lever firmly against the switch board. This lever has spaced contacts arranged in pairs, the contacts of one pair being indicated at 21 and 22 while the contacts of the other pair have been indicated at 23 and 24. Another spring pressed contact 25 is also carried by the lever, all of these contacts being adapted to slide over the surface of the switch board. An elongated arcuate contact 26 is embedded in the switch board and electrically connected to a battery 27 or other source of electrical energy grounded as shown at 28. Contact 22 constantly engages strip 26. Spaced contacts 29 are located near the ends of the strip 26 and are electrically connected to each other and to a grounded stop light 30. The headlights indicated at A are connected by conductors 31 to spaced contacts 32 on the switch board in the path of contact 23. Additional contacts 33, 34 and 35 are in the path of the contact
23. Contact 33 is electrically connected to lamp 5 by a conductor 36. Contact 34 is electrically connected by a conductor 37 to the lamp 4 and the contact 35 is electrically connected by a conductor 38 to the lamp 3.
All three lamps are grounded as shown.

Electrically connected contacts 39 are in circuit with dimmer lamps, not shown, and, if desired, a switch 40 can be provided for controlling the dimmer lamps independently of the actuation of lever 19. A switch lamp 41 is electrically connected to the contacts 39 and is grounded as shown. A switch 42 may be provided in the conductor 31 so that the headlights A can be controlled independently of lever 18.

Contacts 43 are carried by the switch board and are electrically connected, the contacts being in circuit with the alarm 12 that is grounded as shown. The contacts 43 are so positioned that they will be engaged by contact 24 as lever 18 approaches or moves off of the contacts 33, 34 and 35.

It will be understood that by manipulating lever 18 any one of the lamps 3, 4 and 5 can be placed in circuit and that when any one of these lamps is in circuit, the circuit to the headlights is broken while the circuit to the dimmer lights is closed provided, of course, switch 40 is closed. As lever 18 moves off of or onto contacts 39 the alarm 12 will be sounded to warn of the change of signal.

Importance is attached to the fact that the same signal will be displayed both in front and in rear of the semaphore and that it becomes unnecessary in order to change the signals, to provide a rotatable signal device, and the necessary mechanism for operating it. Thus the cost of this structure is reduced considerably as compared with those utilizing movable signal portions.

For the purpose of holding the cage tightly within the housing a spring 44 is secured to the top of the cage and is adapted to thrust against the closed top of the housing 13 when the cage is inserted thereinto. The cage can be firmly held in place by means of studs or screws 45 extending radially from the cage and insertible into bayonet slots 46 in the housing.

What is claimed is:—

In a device of the class described, the combination with a housing and means for attaching the same to a support, said housing having opposed series of superposed windows, of a cage comprising a base insulating strip, an arcuate plate fixedly attached thereto, an arcuate plate hingedly connected to the first mentioned plate and detachably connected to the strip, said arcuate plates having superposed windows therein adapted to open into the respective windows in the housing, partitions connected to the fixed plate and interposed between both arcuate plates, said partitions dividing the cage into superposed compartments, lamps within the respective compartments and carried by the base strip, said housing having an open end to receive the cage, yielding means within the housing for bearing against the cage and the housing, and means for detachably securing the cage within the housing.

In testimony that I claim the foregoing as my own, I have hereto affixed my signature

JOHN P. HANSON.